US008818568B2

(12) United States Patent
Kim et al.

(10) Patent No.: US 8,818,568 B2
(45) Date of Patent: Aug. 26, 2014

(54) SATELLITE-BASED AUTOMATIC STEERING SYSTEM

(75) Inventors: Donghyun Kim, Fredericton (CA); Jason Bond, Fredericton (CA)

(73) Assignee: Gemini Navsoft Technologies Inc., Fredericton (CA)

( * ) Notice: Subject to any disclaimer, the term of this patent is extended or adjusted under 35 U.S.C. 154(b) by 0 days.

(21) Appl. No.: 13/185,548

(22) Filed: Jul. 19, 2011

(65) Prior Publication Data

US 2012/0179305 A1 Jul. 12, 2012

Related U.S. Application Data

(60) Provisional application No. 61/365,435, filed on Jul. 19, 2010.

(51) Int. Cl.
*G06F 7/00* (2006.01)

(52) U.S. Cl.
USPC ............................................................ 701/2

(58) Field of Classification Search
CPC ........ B66C 19/00; B66C 19/07; B66C 13/48; B60W 2550/402
USPC ............................................................ 701/2
See application file for complete search history.

(56) References Cited

U.S. PATENT DOCUMENTS

| | | | |
|---|---|---|---|
| 5,806,016 | A | 9/1998 | Henderson et al. |
| 5,944,132 | A * | 8/1999 | Davies et al. ................. 180/168 |
| 7,032,763 | B1 | 4/2006 | Zakula, Sr. et al. |
| 7,400,956 | B1 * | 7/2008 | Feller et al. .................... 701/41 |
| RE41,358 | E | 5/2010 | Heiniger et al. |
| 2003/0080785 | A1 * | 5/2003 | Linam et al. ..................... 327/72 |
| 2004/0170138 | A1 * | 9/2004 | Blevins et al. ................ 370/328 |
| 2006/0064222 | A1 | 3/2006 | Palmer |
| 2006/0125686 | A1 | 6/2006 | Deimert et al. |
| 2009/0033053 | A1 | 2/2009 | Markiton et al. |

OTHER PUBLICATIONS

International Bureau of WIPO, International Search Report and Written Opinion of the International Searching Authority dated Oct. 25, 2011, issued in respect of International Application No. PCT/CA2011/000827.
Emil M. Petriu, Fuzzy Systems for Control Applications, pp. 1-30, Ottawa, Ontario, Canada.
H. Sun et al., Real-Time GPS Reference Network Carrier Phase Ambiguity Resolution, Jan. 25-27, 1999, pp. 1-7.
Steven D. Kaehler, Fuzzy Logic—An Introduction, Part 3, pp. 1-4.

(Continued)

*Primary Examiner* — Calvin Cheung
*Assistant Examiner* — Yazan A Soofi
(74) *Attorney, Agent, or Firm* — Norton Rose Fulbright Canada LLP

(57) ABSTRACT

Methods, systems, and machine-interpretable coding for causing a processor of a vehicle controller installed in a vehicle such as a rubber-tired gantry (RTG) to generate, using known position associated with a base station and signals received from a Global Navigation Satellite System (GNSS) receiver located at the base station, a satellite observation error estimate; generate, using the satellite observation error estimate and a position of vehicle determined using signals received from a GNSS receiver mounted on the vehicle, at least one control signal representing a navigation command executable by at least one control device of the vehicle; and to output the control signal for execution by the control device. Generation of control signals can include use of synchronous and asynchronous processing, ambiguity resolution processes, and as fuzzy logic and PID and other control feedback loops.

18 Claims, 7 Drawing Sheets

(56) References Cited

OTHER PUBLICATIONS

Hasanuddin Z. Abidin, On-the-Fly Ambiguity Resolution, GPS World, Apr. 1994, pp. 40-49.
Jan Jantzen, Design of Fuzzy Controlllers, Aug. 19, 1998, pp. 1-27, Technical University of Denmark.
Dr. Donghyun (Don) Kim et al., Gantry Crane Auto-Steering, The Worldwide Magazine for Geomatics, Oct. 2003, vol. 17, pp. 47-51.
Peter J.G. Teunissen et al., GPS for Geodesy, Second Completely Revised and Extended Edition with 127 Figures and 32 Tables, pp. 319-336,The Netherlands Company.
Donghyun Kim, et al., Shipyard Giants, GPS World, Sep. 2002, pp. 28-34.

* cited by examiner

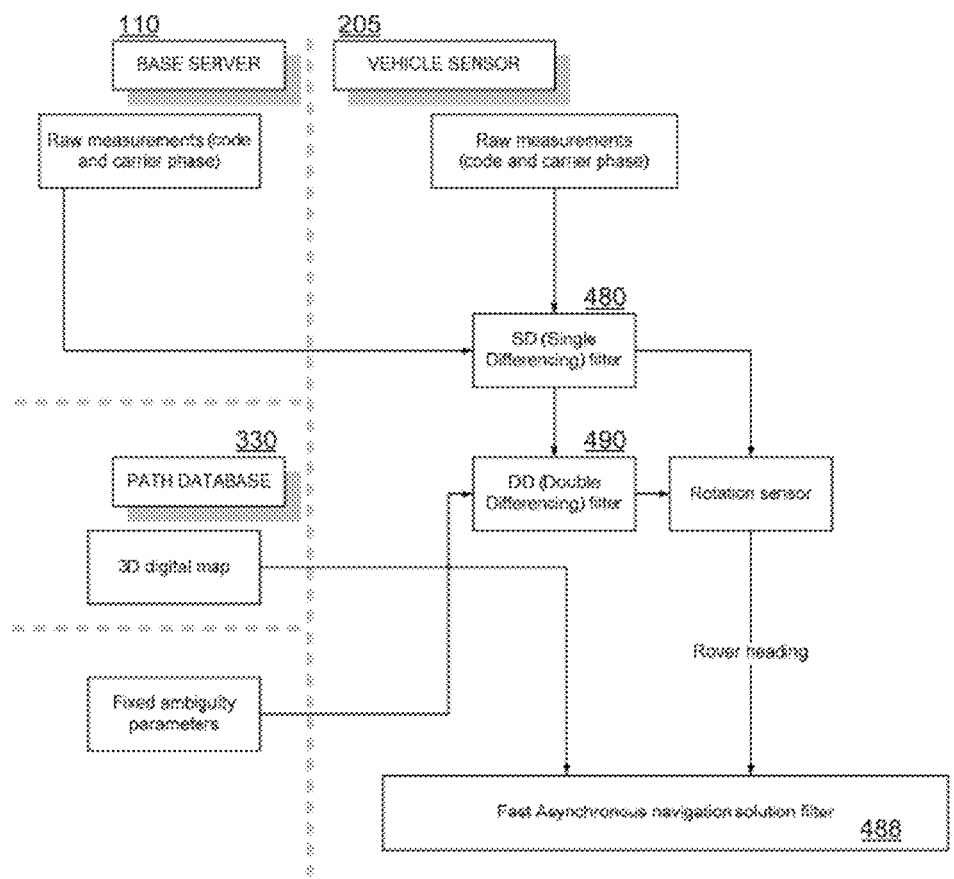

SATELLITE-BASED AUTOMATIC STEERING SYSTEM

TECHNICAL FIELD

The present disclosure relates to automatic steering and navigation systems, and particularly to improvements in systems of such types which use satellite-based position data.

BACKGROUND

Satellite based navigation systems such as the Global Positioning System (GPS) and other global navigation satellite systems (GNSSs), and other navigation systems implemented using remote sensors, are useful for the control, including particularly the automated navigation, of vehicles. Such navigation systems have been used, for example, for the automatic steering of vehicles, including rubber-tied gantry (RTG) cranes, lawn mowers, and tractors, and other automated ground vehicles over redundant, replicable or otherwise pre-defined paths. Navigation of such vehicles may include automatically matching a trajectory of a vehicle to a pre-mapped path or otherwise desired pre-determined path. Navigation systems suitable for use in implementing such systems may include, for example, GNSSs and/or other satellite-based systems, and local systems using for example transmitters emitting positioning signals from known positions inside buildings, etc. Examples of GNSSs may include, for example, the Galileo positioning system, the GLONASS navigation system, and the Compass navigation system, among others.

In a variety of ways, improvements in satellite- and other remote-sensor based automatic navigation are desirable, both with respect to the quality of the navigation processes (e.g., with respect to the accuracy and/or reliability of navigation, and the stability of navigated vehicles) and in the application of such processes to broader ranges of vehicle types—including, for example, transit buses, passenger aircraft, and other vehicles which it may be desirable to guide over predefined paths reliably, with high accuracy.

SUMMARY

In various aspects, the invention provides systems, methods, and machine-interpretable coding and/or other instruction products, such as stored software or other computer programming, useful for the generation of signals representing automatic steering, or other navigation control, commands, using satellite and/or other sensor data. Such systems, methods and/or instruction products may, for example, be suitable for use in the automatic steering of vehicles in known proximity to stationary (or substantially or relatively stationary) base station(s). Such vehicles may, for example, be equipped with single or multiple satellite sensors (e.g., GPS or other GNSS sensors) and transceivers adapted for receipt and processing of signals from GNSS satellites.

In various embodiments, the invention provides methods, machine-interpretable coding for causing a processor of a vehicle controller to generate, using known position associated with a base station and signals received from a GNSS receiver located at the base station, a satellite observation error estimate; generate, using the satellite observation error estimate and a position of vehicle determined using signals received from a GNSS receiver mounted on the vehicle, at least one control signal representing a navigation command executable by at least one control device of the vehicle; and to output the control signal for execution by the control device; and corresponding automatic control systems.

In various embodiments, the invention provides very high precision and accuracy—for example, better than ±2 cm positioning error in horizontal components, with 99.9% confidence level—in the automatic control of vehicles.

Various embodiments of systems, methods, and/or machine-interpretable instruction products according to the invention implement and/or employ various combinations of synchronous and/or single- or multi-mode asynchronous data processing techniques. The use of such various combinations can, for example, as described herein, provide highly precise and highly stable control of a wide variety of types of vehicles.

Various embodiments of systems, methods, and/or machine-interpretable instruction products according to the invention implement and/or employ various processes for removing or reducing errors in signals received from remote position data sources, including for example carrier phase information received from GNSS satellites.

Various embodiments of systems, methods, and/or machine-interpretable instruction products according to the invention implement and/or employ various combinations of fuzzy logic and various forms of control feedback loops, including for example proportional-integral-derivative (PID) control algorithms, in maintaining the reliability, accuracy, and stability of vehicle navigation processes, while improving the efficiency of navigation processes. The use of such various combinations can, for example, as described herein, provide highly precise and highly stable control of a wide variety of types of vehicles.

In various embodiments the invention makes use of one or more base station system working in cooperation with various forms of systems mounted on or otherwise associated with controlled vehicles. Both base station and vehicle-mounted systems may advantageously make use of single and/or multiple satellite receivers and/or sensors.

Among other advantages offered by various aspects of the invention, in many applications the use of single- and/or multi-mode asynchronous processing techniques has been determined to allow stable, reliable, and efficient control of vehicles using reduced numbers of vehicle-mounted position (e.g., GNSS) sensors. In particular, it has been found to be possible to use a single vehicle-mounted GNSS sensor to control an automatically navigated vehicle with significantly improved reliability, stability, and efficiency in navigation.

As will be understood by those skilled in the relevant arts, the automatic control of vehicles is a complex task involving a wide number of parameters, in which varying degrees of precision, accuracy, reliability, efficiency, and safety may prove critical. Among the benefits of various aspects of the improvements disclosed herein is the ability to control vehicles reliably, safely, and efficiently using a reduced number of components, in comparison to other known automatically-controlled vehicles.

For example, the inventors have found that a particular application well served by improvements described herein is the control of rubber-tired gantry (RTG) cranes used, for example in offloading ships, trains, and other vehicles in container terminals. In such applications the inventors have found that a control system comprising a GNSS receiver mounted on the RTG vehicle; at least one transceiver for processing signals received from at least one GNSS receiver located at a base station located nearby, and particularly within the area of the container terminal, and associated with a known location; and a controller comprising at least one data processor configured to: generate, using the known position associated with the base station and signals received from the GNSS receiver located at the base station, a satellite observation error estimate; generate, using the satellite observation error estimate and a position of the vehicle determined using signals received from the GNSS receiver mounted on the vehicle, at least one control signal representing a navigation command executable by at least one control device of the vehicle; and to output the control signal for execution by the control device; serves particularly well. In such systems, the use of ambiguity resolution algorithms, and particularly those used in employing double-differenced GNSS carrier phase data, can be highly useful, particularly when used in conjunction with various combinations of synchronous and single- or multi-mode asynchronous signal processing, fuzzy logic, and control feedback algorithms such as proportional-integral-derivative (PD) feedback techniques.

In other embodiments, the invention provides methods and further components, including software, for implementing the various functions and processes described herein.

BRIEF DESCRIPTION OF THE DRAWINGS

Reference will now be made to the drawings, which show by way of example embodiments of various aspects of the invention, and in which:

FIGS. 6 and 7 are schematic diagrams illustrating aspects of examples of asynchronous data processing operations in accordance with embodiments of the invention.

DETAILED DESCRIPTION

Figure 1A:
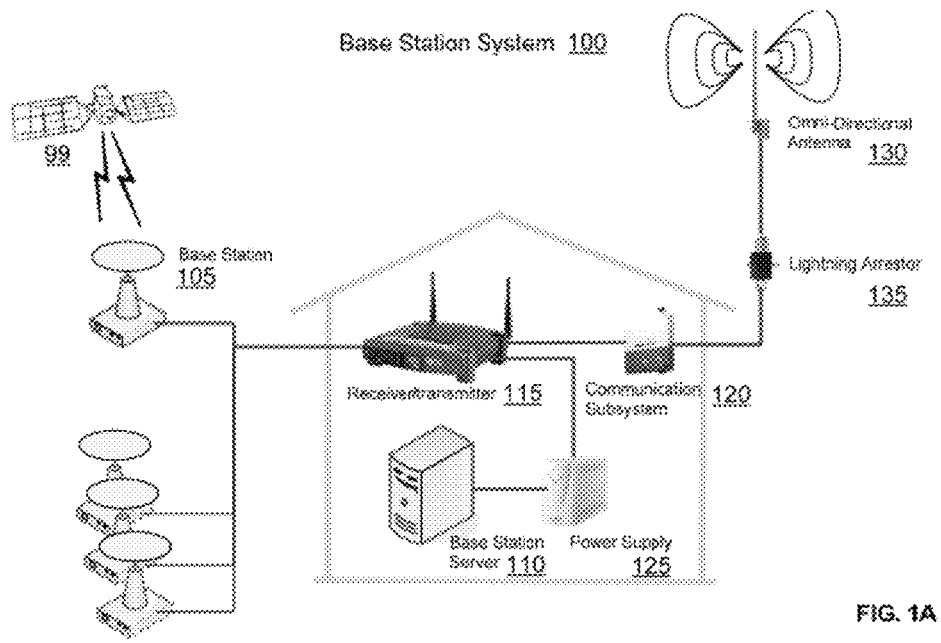
FIG. 1A and FIG. 1B are schematic diagrams showing embodiments of base-station and vehicle-mounted (sub)systems suitable for use in implementing the invention.

In various aspects, the invention provides systems, methods, and machine-interpretable instruction products such as machine-readable media storing computer programming products for use in the automatic navigation of vehicles. Navigational functions provided by the invention may include orientation (also referred to as attitude) control, as well as position and velocity control.

Among other advantages, systems, methods, and instruction sets according to the invention provide high precision (e.g., better than ±2 centimeters horizontally, with 99.9% or greater confidence) in the guidance and positioning of such vehicles. In various embodiments such precision is provided by some or all of differential correction or relative positioning, based, at least in part, on signals provided by base stations which are stationary or otherwise occupy locations known with a high degree of accuracy (e.g., moving along a well defined or calculated path); on the use of synchronous and asynchronous signal processing modes; and the use of fuzzy logic and/or control feedback loops.

Differential correction or relative positioning based on signals provided by base stations which occupy locations known with a high degree of accuracy can be used, for example, in correcting or improving position estimates based, at least in part, on signals provided or determined by satellite-based systems (e.g., GPS or other GNSS sensors and/or receivers) mounted or otherwise provided on moving vehicles. Such differential correction or relative positioning processes may be referred to, or can include satellite observation error estimates.

In various aspects and embodiments the invention is suitable for use in guiding a very wide variety of vehicles, including land vehicles (e.g., gantry cranes, lawn mowers, tractors, and/or automobiles); water vehicles; and/or air vehicles such as crop dusters, passenger or cargo transports, or other aircraft. Automatic navigation of such vehicles may be based on matching a desired trajectory of the vehicle to a pre-defined or otherwise calculated path, which process may be referred to as a "map and match" mode of operation, and/or on direct or otherwise optimized or otherwise desired point-to-point navigation techniques. The invention is, for example, useful for repetitive navigation applications (e.g., gantry crane autosteering, lawn mowing, and planting and harvesting) as well as non-repetitive navigation applications (e.g., an intelligent vehicle guidance for collision avoidance in automobiles, aircraft, etc.).

As described herein, in various embodiments the invention provides for and operates according to either or both of synchronous and asynchronous modes of operation, depending for example upon the frequency with which data is available from, and/or may be processed by, either or both of base- and vehicle-mounted receiver stations, and/or by other associated navigation controllers; and/or the velocity and/or stability of the navigated vehicle(s).

Synchronous modes can, for example, include calculations made using GPS and/or other GNSS-generated measurements received on board a navigated vehicle and at a base station at the same time, or at times which may be correlated to each other and provide a synchronous or near-synchronous position, attitude, and/or velocity solution. For example, GNSS measurements received from both a base station and a vehicle-mounted receiver can be compared, using time stamp data associated with the signals, to very accurately fix the position of a vehicle at a given point in time, based on known satellite positions at that given point. Such synchronous modes can be particularly useful in fixing vehicle positions and/or attitudes with a very high degree of accuracy. Synchronous modes may further be useful in, for example, resolving ambiguities in GNSS measurements (e.g., resolving carrier-phase integer ambiguities, which are in some circumstances inherent to satellite-based navigation), which may further contribute to the high degree of accuracy possible.

The use of asynchronous modes can enable calculations to be made at rates faster than those at which synchronous data is available by, for example, extrapolating from last-known or most-recently-available synchronous data. One or more asynchronous modes may be used, for example, to monitor and/or control attitude, position, and/or other control parameters, and may be used with particular advantage in monitoring and/or controlling navigational parameters which are especially critical or unstable, such as some attitude parameters. Asynchronous modes can advantageously involve the use of data derived from synchronous observations from which ambiguities have been resolved through the use of, for example, known ambiguity resolution processes.

Employment of one or more asynchronous modes in combination with synchronous modes, which is sometimes referred to as mixed-mode processing, may be useful, for example, where GNSS measurements are available from (relatively-) fixed base stations, and/or may otherwise be processed at relatively slower rates than it may be possible to process data using resources provided on board a navigated vehicle. For example, synchronous GNSS measurements may be available, or otherwise processable, at rates of approximately 1 hertz (Hz), while it may be possible to process control algorithms, using data and computational resources available on board a vehicle, at rates one or more orders of magnitude or so faster—at, for example, 10-20 Hz.

As will be understood by those skilled in the relevant arts, asynchronous solutions may periodically, occasionally, or continually be corrected using data generated using synchronous modes.

It may in some circumstances be desirable to process data asynchronously at multiple rates, including one or more relatively higher rates, in order, for example, to monitor and/or control especially sensitive or unstable parameters such as vehicle attitude. For example, in a system in which synchronous, base station-derived and/or base station-synchronized position data is available at 1 Hz, positional data (e.g., position control signals) may be calculated (or generated) asynchronously on board a navigated vehicle at a rate of approximately 10 Hz, while vehicle attitude control signals may be generated asynchronously at rates on the order of 100 Hz.

As noted, the employment of one or more asynchronous modes or processes may be useful where, for example, base station data may be broadcast, or otherwise made available, at a slower rate than is needed for on-board signal generation, due to bandwidth or other limitations. Between receipt of fresh data sets from the base station(s), aged base data (i.e., the most recent data received from the base station(s)) may be processed on board for interim navigational purposes. Such on-board processing may be based on algorithms which appropriately assume or otherwise account for anticipated errors or error trends in base station data, and which would generally not introduce errors in on-board generated control data larger than a desired/acceptable error threshold in the time between receipt and/or processing of fresh base data sets. Errors between synchronous and asynchronous data may arise, for example, relative to satellite orbit position(s), satellite clock(s) and/or atmospheric effects (e.g., ionosphere and troposphere) on the transmission of signals.

Thus, in various embodiments the invention provides for the use of synchronous and single- or multi-asynchronous modes in generating position, velocity, and attitude data, and/or control signals.

As will be understood by those skilled in the relevant arts, the desirability of using synchronous and/or asynchronous processing, and the rates at which such data is processed, may depend upon a wide number of factors, including for example vehicle speed, dynamic stability of relevant control parameter(s), payload, mission and/or application sensitivity, etc.

In some embodiments, vehicles to be navigated in accordance with the invention may advantageously be provided with single navigation antenna/receiver systems (e.g., single GPS or other GNSS receivers). In such configurations, heading solutions may be derived using on-board velocity estimates, which may be processed substantially instantaneously (i.e., in "real time") using, for example, one or more asynchronous processing modes. Redundant and/or alternative heading solutions may be derived through the use of satellite-based rotation sensors and/or satellite-based heading filters, and/or the use of various forms of inertial devices.

Redundant and/or alternative navigation solutions (especially, for example, related to vertical, or altitude, components) may be derived through the use of, or with the assistance of, pre-defined paths (e.g., a digital map) and/or satellite-based altitude filters. Such satellite-based filters can include sensors and receivers that receive and process data from, for example, a satellite navigation system (e.g., GPS or other GNSS system) in order to determine an orientation or altitude, or confirm such parameters determined through other means. In other examples, vehicles guided in accordance with the invention may be provided with two or more antenna/receiver systems for use in, for example, making redundancy checks. The use of such redundancy checks can, as will be understood by those skilled in the relevant arts, contribute to improved accuracy, reliability, and safety in navigation.

In various embodiments, systems according to the invention comprise base station server(s) and vehicle (or rover) client system(s), either or both of which can include navigation controllers comprising one or more processors configured for generating control signals and outputting them to control devices useful for navigating one or more vehicles. Base station servers in such embodiments may be communicatively linked to one or more base receivers and, working in cooperation with such receivers, may monitor the status of the base station(s), generate a satellite observation error estimate and provide data useful for carrying out comparisons and/or corrections on position data determined at the vehicle client system(s). Such base station server(s) may receive and process raw satellite-based observations from the base station(s) in substantially real time.

Vehicle client systems may be mounted on or otherwise provided on, or in otherwise known relation to, vehicles; and may communicate with such base station servers through the use of, for example, wireless communications technologies to push and/or pull base station data (e.g., base station position, base station receiver or antenna type, a satellite observation error estimate, and raw base station observations) for use in controlling corresponding vehicles.

Figure 1B:
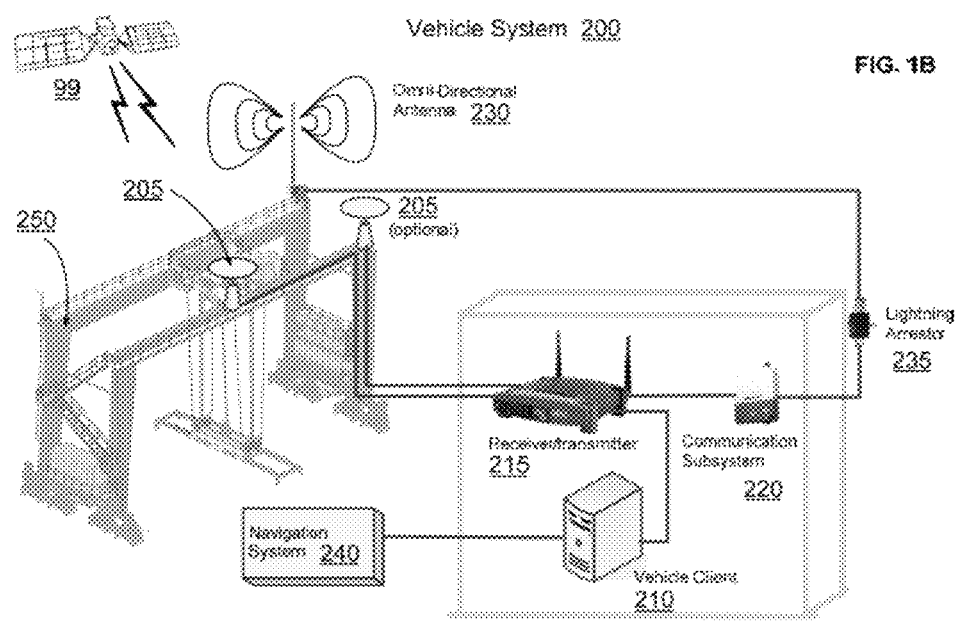

Reference is now made to FIGS. 1A and 1B. FIGS. 1A and 1B are schematic diagrams showing example base-station systems 100 and vehicle-mounted systems 200 suitable for use in implementing aspects of the invention.

In the embodiment shown in FIG. 1A, a base station system 100 includes one or more receiver base stations 105, each comprising one or more satellite-based position signal receivers (e.g., GPS or other GNSS receivers) adapted to receive from one or more transmitters 99 (e.g., satellites or other signal sources) signals useful in determining the geographic or other position(s) of the base station receiver station(s) 105. Each base station 105 is stationary, or relatively stationary, or otherwise located in a relatively accurately-knowable position, and may be placed so as to serve as a reference point in providing correctional or confirmational data for vehicle or rover systems operating nearby. Any known location of any type compatible with the purposes described herein, including for example specially-placed or -constructed structures, or any known geographic location with a suitably-accurately placed mobile receiver, will serve.

Satellite-based or other sensor signals received by base station(s) 105 may be provided (e.g., via wired or wireless communications means) by a respective sensor to one or more signal receiver(s)/transmitter(s) 115 (e.g., one or more internet routers) associated with a base station server 110. Base station server(s) 110 (and receiver(s) 115) may be powered by one or more power supplies 125, which in various applications are preferably uninterruptible. Base station system(s) 100 may transmit/receive data via communication subsystem(s) 120 (e.g., an Internet access point). For example, a base station system 100 can receive satellite-based data signals from one or more signal sources 99 such as satellites.

The received signals can be processed by the base station server 110 to interpret them as providing information on a nominal, or signaled, position of the base station. Such nominal or signaled position may be compared, e.g., by the base station server 110, to a determined actual or defined position of the base station 105 (for example, its otherwise known actual geographic position, as opposed to a more- or less-erroneously determined position based on received raw signals); and any corresponding positional errors may be determined based on a detection of anomalous range measurements from the satellites. The determined error(s) may be used to generate corrected or corrective signals, and used in generation of control signals to be transmitted to vehicle(s) 200.

Satellite-based data and/or other base station information may be transmitted by the base station system 100 to one or more vehicle-mounted or rover systems 200 via communications subsystem 120 and may, for that purpose, include or employ one or more antennas 130 (e.g., omni-directional antenna(s)) and auxiliary components such as optional lightning arrestor(s) 135, and/or other desired or required components for suitably secure transmission/reception of data signals.

In the embodiment shown in FIG. 1B, a vehicle or "rover" system 200 comprises one or more position data receivers 205 (e.g., GPS or other GNSS receivers) mounted on or otherwise associated with a vehicle 250 to be wholly or partially automatically navigated. Preferably, receivers 205 are provided in fixed or otherwise-defined relationship(s) to vehicle(s) 250. In some embodiments it can be advantageous to provide a vehicle system 200 with two or more sensors 205, for example to help improve system reliability, although in various embodiments this is not necessary.

Data representing, or otherwise useful in determining, the position of vehicle sensor(s) 205, and therefore corresponding to or otherwise useful in determining the position of vehicle 250, may be received by sensor(s) 205 from one or more satellites or other signal sources 99, and provided by the sensor(s) 205 to one or more receiver(s)/transmitter(s) 215 of vehicle client system(s) 210 for processing as disclosed herein.

Vehicle system(s) 200 may comprise or communicate with one or more navigation controllers, or control devices, 240 such as, for example, one or more steering controllers or steering systems, to facilitate generation and/or other processing of signals representing steering and/or other navigation control commands.

Vehicle system(s) 200 may transmit/receive data signals via one or more communication subsystem(s) 220 (e.g., one or more Internet access point(s)), which may for example include one or more antennas 230 (e.g., one or more omni-directional antenna(s)) and/or auxiliary components, such as lightning arrestor 235, to facilitate transmission/reception of data.

Although a single vehicle 250 and rover system 200 are shown, systems in accordance with the invention may include multiple vehicles 250 and/or vehicle systems 200, for use in navigating multiple vehicles. Embodiments of the invention comprising pluralities of vehicles 250 may provide one or more vehicle systems 200 for each controlled vehicle 250. For example, a single vehicle 250 may comprise multiple redundant systems 200, in order to ensure reliability and/or accuracy of navigation. In other examples, where there is a plurality of vehicles, a single vehicle client may process information from and provide steering or other navigation control for a plurality of vehicles.

Figure 2:
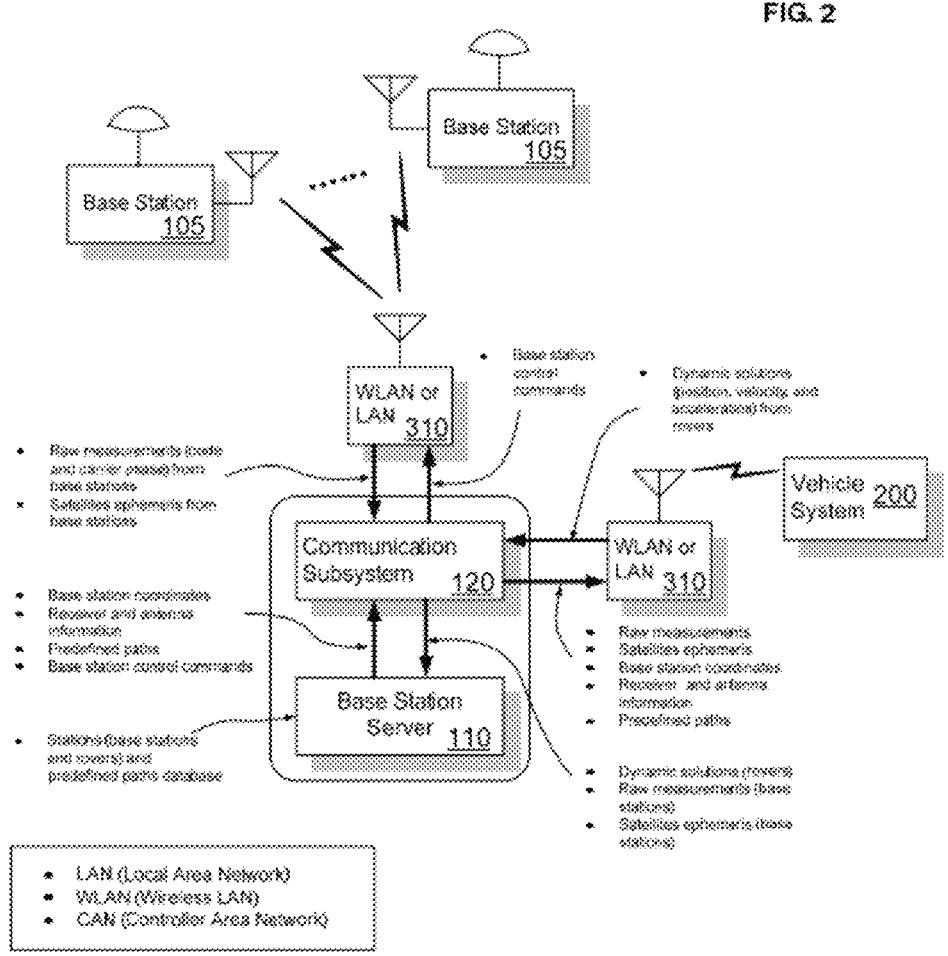
FIG. 2 is a schematic diagram illustrating example signal processing operations performed by a base station (sub)system in accordance with the invention.

FIG. 2 is a schematic diagram illustrating example signal processing operations executed by, for example, a base station system 100 in implementing aspects of the invention. Each of one or more base station(s) 105 communicates, wirelessly or otherwise, position signals received from one or more signal sources 99 (FIGS. 1A and 1B) to base station server(s) 110, for example through a wired or wireless local area network (LAN or WLAN) 310. Such position signals may include, for example, satellite code and carrier phase data and satellite orbital (or "ephemeris") information. The base station(s) 105 may also receive signals (e.g., from the base station server 110) which may for example provide information such as pre-determined base station position data, receiver/antenna types, satellite observation types, data update rates, and data communications information.

Base station server(s) 110 may include processor(s) (not shown) for carrying out, recording, and/or otherwise implementing positioning and/or other navigational processes as described herein. Base station server(s) 110 may further include memory(ies) (not shown) for storing data such as pre-defined navigation paths, known or estimated base station locations, and/or other position/navigational data. Base station server(s) 110 may exchange signals with other components of system(s) 100, 200 through any one or more communication subsystems 115, 120 that may receive signals from and transmit signals to the base station(s) 105 and/or vehicle system(s) 200 (e.g., through a LAN or WLAN 310). Base station server(s) 110 may receive through communications subsystem(s) 115, 120 signals representing, for example, raw satellite-based range (or positioning) and ephemeris data from the base station(s) 105, and dynamic navigation solutions, and/or other data relating to the vehicle system(s) 200, such as the operational status of the vehicle system(s) 200, from vehicle system(s) 200. Base station server(s) 110 may transmit signals representing pre-determined coordinate locations of the base station(s) 105; satellite receiver and antenna information; navigational information such as data related to pre-defined paths for the vehicle(s) 250 to travel; and any other desired or required information.

Base station system(s) 100 may transmit to controlled or otherwise associated vehicle system(s) 200 signals representing, for example, satellite-based raw measurements from the base station(s) 105, satellite ephemeris information from the base station(s) 105, pre-determined coordinates of the base station(s) 105, data information about the receiver(s) and antenna(es); and/or information relating to pre-defined paths and/or other navigational data useful in steering or otherwise directing the corresponding vehicle(s) 250. Base station system(s) 100 may also receive signals from the vehicle system (s) 200 representing, for example, data or solutions useful in navigating or monitoring the corresponding vehicle(s) 250, including for example data or solutions relating to current or desired linear or rotational position(s), velocity(ies) and/or acceleration(s).

Figure 3:
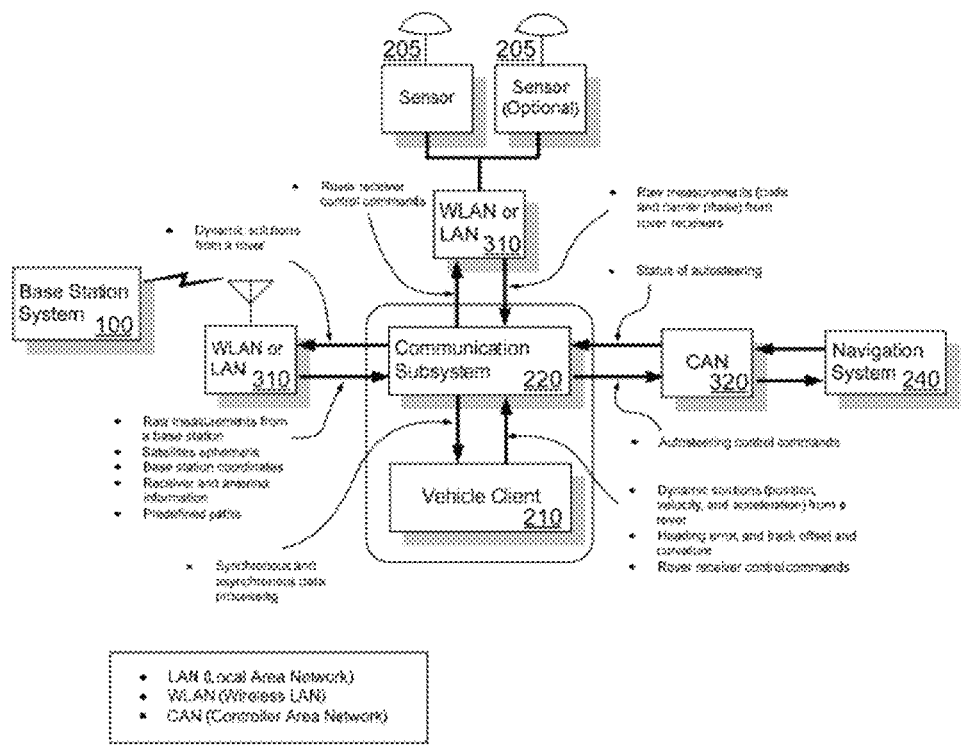
FIG. 3 is a schematic diagram illustrating example signal processing operations performed by a vehicle-mounted (sub) system in accordance with the invention.

FIG. 3 is a schematic diagram illustrating example signal processing operations of a vehicle-mounted system 200 for a vehicle 250 in accordance with the invention. In the example shown, a vehicle 250 is provided with one or more GNSS or other position sensors 205. Vehicle system 200 will be described mainly with reference to only one sensor 205 provided for the vehicle. In some examples, where multiple sensors 205 are used, the use of multiple sensors 205 may allow for cross-checking of solutions and/or data among sensors 205. For example, the data and/or solutions derived from the sensors 205 may be verified to agree with each other within one or more pre-determined thresholds.

Vehicle (or "rover") sensor(s) 205 may communicate with vehicle client systems 210, 240, etc., using WLANs and/or LANs as previously discussed. Vehicle sensor(s) 205 may transmit/receive signals representing, for example, raw satellite-based data (e.g., code and carrier phase information) and/or other satellite-related signals, as desired. Sensor(s) 205 may receive control and other signals from the vehicle client 210 and/or, for example, via WLAN or LAN 310, base station server(s) 110, etc.

A vehicle client system 210 may include processor(s), memory(ies), and other components useful in generating, executing or acting upon, and otherwise processing automatic steering and other navigational control commands for use by vehicle navigation system(s) or control device(s) 240 and/or for processing by base station server(s) 110, as described herein. Vehicle client memory(ies) may be used to store, among other records, calculated position data and/or pre-defined paths for the vehicle. Control signals generated or otherwise processed by vehicle client 210 and/or other components of systems 100, 200, etc., may be communicated to navigation system(s) or control device(s) 240 via, for example, a controller area network (CAN) 320.

A vehicle client 210 (and/or any one or more base station server(s) 110 or other data processors) may carry out either or both of synchronous and asynchronous processing of satellite-based data in order to optimize and/or otherwise implement navigation processes for vehicle(s) 250. For example, a vehicle client 210 may process such data as a part of calculating dynamic solutions (e.g., position, velocity and acceleration) for the vehicle.

The vehicle client 210 may also calculate or otherwise process fuzzy logic or control feedback input values, for example heading error, track offset and curvature values, which may be used in one or more fuzzy logic or control feedback algorithms for generating steering commands. For example, using fuzzy control parameters (e.g., input/output functions) determined in an optimization process, fuzzy output values (e.g., steering angle and speed) may be estimated. Vehicle client(s) 210 may also provide control commands to the sensor 205 on the vehicle.

Automatic steering and/or other navigation commands, which may include, for example, steering angle and speed commands (e.g., as determined by the vehicle client 210) may be transmitted to the navigational system(s) 240. Navigational system(s) 240 may transmit status and/or other feedback data (for example, wheel angles, pedal actions and joystick actions) to be processed by the vehicle client 210 and/or other components of system(s) 100, 200, etc.

Figure 4:
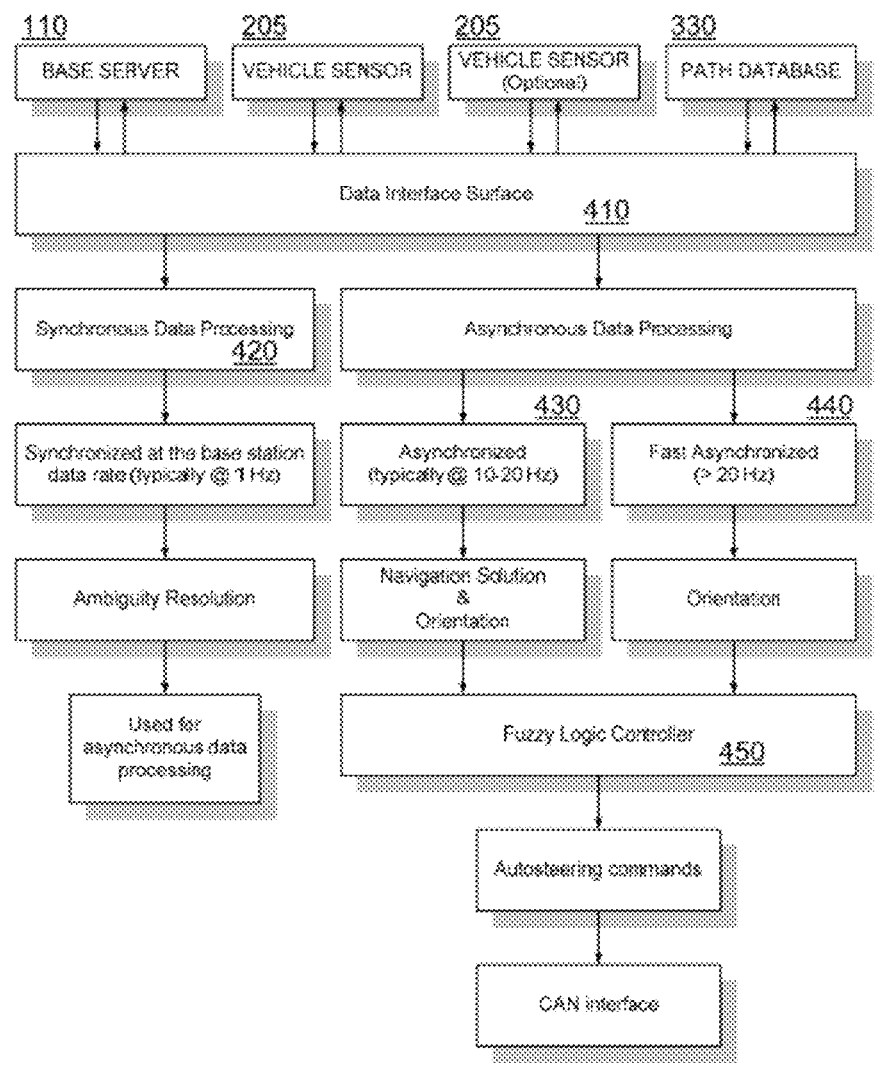
FIG. 4 is a schematic diagram illustrating aspects of an example process for generating navigation control command signals in accordance with the invention.

FIG. 4 is a schematic diagram illustrating aspects of an example process for generating automatic steering and/or other navigational control command signals in accordance with the invention. Such processes may be carried out by vehicle client system(s) 210 and/or other processors, in standalone or distributed data processing schemes. As will be understood by those skilled in the relevant arts, in many circumstances it can be advantageous to have all or various portions of such processes performed on board a vehicle 250, or otherwise in close proximity to rover station(s) 205 and/or navigational system(s) 240, in order to minimize data processing and navigation-system response times, and/or otherwise optimize control of the vehicle(s) 250.

In various embodiments the blocks shown in FIG. 4 and the other figures described herein can be interpreted as any of a wide variety of programming blocks or modules, engines, routines, applications, or software layers or other programming structures, and/or combinations thereof, adapted to interact with and support each other in implementing various processing tasks related to fully- or partially automatic navigation of vehicle(s) 250. As will be understood by those skilled in the relevant arts, a wide variety of such structures, now known and doubtless hereafter to be developed, are and will be suitable for use in implementing the invention.

Data interface surface(s) or layer(s) 410 may be used for interfacing or otherwise facilitating data communications between any one or more of base station server(s) 110, vehicle sensor(s) 205, and database(s) 330 storing pre-defined paths and/or other data useful in navigating the vehicle(s) 250. A data interface surface 410 can, for example, be implemented as a part of, or otherwise in association with, vehicle client(s) 210. For example, data interface surface(s) 410 can advantageously be implemented as component(s) of communication subsystem(s) 220.

Data used by system(s) 210, 110, etc. in generating and/or otherwise implementing navigational control signals may be processed synchronously (i.e., where up-to-date base station satellite-based information is available but is processed separately from vehicle satellite-based information, such as when base station information is temporally delayed or otherwise cannot be processed efficiently in real time) or asynchronously (i.e., where up-to-date vehicle satellite-based information is available and is processed in real time, and older base station satellite-based information is used).

Using synchronous data processing processes starting for example at 420, raw satellite data or satellite-based data provided by base station(s) 105 and/or one or more vehicle sensor(s) 205 may be used to resolve ambiguities in satellite carrier-phase data. Satellite carrier-phase ambiguity represents an arbitrary counter setting (typically an integer value) of the carrier-phase tracking register at the start of data from a satellite (i.e., phase lock), which biases all measurements in an unbroken sequence of that satellite's carrier-phase data. Once such ambiguities are determined and accounted for, the carrier-phase data may be used to determine high-precision (e.g., on the order of millimeters) range or position measurements, thus allowing for sub-centimeter determination of position.

Ambiguity resolution processes, many of which are now known, may be susceptible to biases and errors, for example ionospheric and tropospheric delay, satellite orbit error, satellite and/or receiver clock error, antenna phase centre offset and/or variation, instrumental group delay, phase wind-up, and multipath. Some or all of such error sources may be substantially removed or reduced using relative positioning. For example, by differencing satellite-based observations between the base station system 100 and the vehicle system 200 and/or between satellites 99 (e.g., using a double-differencing method), common error sources may be substantially removed or reduced. In general, ambiguities in satellite-based data may be relatively constant or stable over time unless cycle-slip occurs, and thus may be relatively unaffected by time latency. Correction factors for such errors may be determined, if necessary, by the vehicle or rover system(s) 200 and applied, directly or indirectly, by vehicle client(s) 210 to vehicle positions calculated by the client(s) 210 using data provided by vehicle sensor(s) 205.

The use of such ambiguity resolution processes has been found to substantially improve the accuracy, precision, reliability and safety of applications such as the automatic control (of which autosteering is one type) of RTG cranes in, for example container loading and unloading. Details of methodologies suitable for use in resolving carrier phase ambiguities in implementing processes according to this aspect of the disclosure are provided, for example, in Teunissen and Kleusberg (eds.), GPS for Geodesy, published by Springer-Verlag, Berlin, 1996 and 1998 (particularly pp. 321-336); and in H. Abidin, On-the-Fly Ambiguity Resolution, GPS World, April 1994, pp. 40-49.

Parameters used in, generated as a part of, or otherwise related to ambiguity resolution processes at 420 etc., can be stored, for example in memory accessible by vehicle client(s) 210, for use in asynchronous data processing. Asynchronous processing, in this context, includes processing performed by client system(s) 210 using position data generated and/or received directly onboard vehicle 250 through, for example receivers/sensors 205.

The use of one or more asynchronous processes performed by client system(s) 210 may be particularly advantageous where, for example, latencies in communications and/or other issues cause satellite-based data or position data received from base station(s) 100 to be processable at a relatively slower rate compared to data generated or otherwise available on board vehicle system(s) 210. For example, where a vehicle 250 is moving or otherwise changing its navigational status—e.g., position, velocity, acceleration, attitude, or orientation—at a rate that makes it unwise or otherwise undesirable to make each control signal output of either or both of controller(s) 210, 240 dependent upon a confirmed or corrected positional fix using data received from base station(s) 100, one or more asynchronous processes can be performed on board the vehicle(s) 250 to improve stability and control of the vehicles.

In the example provided in FIG. 4, two asynchronous processing modes may be employed: asynchronous data processing 430 at moderate, or relatively slower, data rates (e.g., 10-20 Hz) and relatively fast asynchronous data processing 440 at relatively fast data rates (e.g., greater than 20 Hz, such as 100 Hz). Fast asynchronous data processing 440 may include simplified calculations or may omit certain calculations, which may be useful to lessen the computing load or to accommodate limited computing resources in while providing critical control for unstable or otherwise highly sensitive control parameters. For example, while asynchronous data processing 430 at moderate rates may determine translational navigation solution(s) (e.g., to determine and control position, linear velocity and acceleration of the vehicle) as well as orientation, the fast asynchronous data processing 440 may be used to generate signals for control of relatively critical and/or unstable parameters such as vehicle rotational or attitude orientation.

Data generated using synchronous and/or asynchronous processes 420, 430, 440 may be used directly in generating translational and orientation commands, or may be subjected to further processes first. For example, in order to improve the accuracy, reliability, efficiency, etc., of such commands, further control logic, such as for example fuzzy logic controller process 450 and/or various forms of control feedback loops may be employed.

In various embodiments, a particularly suitable form of control feedback processing has been found to be PID processing. A PID controller typically calculates an "error" value as the difference between a measured process variable and a desired setpoint, and attempts to minimize the error by adjusting control inputs. A PID controller algorithm involves three separate constant parameters: proportional, integral, and derivative values, which can be interpreted in terms of time: P depends on the present error, I on the accumulation of past errors, and D is a prediction of future errors, based on current rate of change. A weighted sum of these three values may be used to adjust the controlled process via a control element such as the output of an autosteering or other automatic navigation control device.

A description of methodologies suitable for use in applying fuzzy logic and control feedback processes, including PID feedback processing, to control processes in accordance with the disclosure provided in J. Jantzen, Design of Fuzzy Controllers, Technical University of Denmark (1998).

Generated translational and/or orientation commands may be transmitted to the vehicle's steering or other navigation system 240, for example via a CAN interface, for implementation using suitably-configured control interfaces.

Automatic steering or other navigational control apparatus may be used to steer, spatially orient, or otherwise cause the vehicle to follow a pre-determined or other desired path, or assume a desired orientation with respect to a desired reference.

The use of stored pre-determined paths may allow vehicle(s) 250 to automatically steer desired courses or otherwise travel to desired locations, optionally at desired speeds and in accordance with desired vehicle orientations. Pre-defined paths may be provided in a navigational database 330 (see, e.g., FIG. 5), for example by driving the vehicle (e.g., by a human operator) over the path and recording the path by periodically storing observed position and/or attitude data (derived, for example, using signals from either or both of base station and vehicle systems 100, 200, and/or other position/attitude sensors) in a suitably-configured navigational database 330 (see, e.g., FIG. 5). The pre-defined path may be recorded and stored with satellite-based positioning data for later access by, for example, a vehicle controller 210, so that the vehicle controller 210 can autonomously reproduce the mapped path by comparing observed current position(s) and/or attitude(s) to recorded, desired (or otherwise commanded) position(s) and/or attitude(s) and generating suitable command signals for steering, throttle, and/or other navigation system(s) 240. Multiple paths can be mapped and each path may be associated with a particular site or location, for example using the satellite-based coordinates within the path. Pre-defined navigation paths may be stored, for example, locally in memory(ies) accessible by or otherwise associated with vehicle client(s) 210, downloaded to separate storage (e.g., removable USB flash memory drives) and/or uploaded from memory(ies) of base station server(s) 110.

For example, where the vehicle 250 is an RTG crane, the RTG crane may be moved to an operations site (e.g., a plot of a container yard). The operations site may be selected (e.g., by a human operator) from a corresponding, pre-stored list, and a desired navigation path may be matched or selected from a list of paths saved for the site. Such a path can be selected from a path database 330 stored in the vehicle client 210 memory and/or downloaded from the base station server 110. The vehicle client 210 may also (e.g., at substantially the same time) send its position to the base station server 110. Upon receiving the RTG crane's position, the base station server 110 may establish a communication connection between the vehicle client 210 and one or more base stations 105 (e.g., the nearest base station) for reception of real-time satellite-based data stream from the base station(s) 105.

Once a pre-defined path has been selected or downloaded, the RTG crane can be positioned at or near the start of the pre-defined navigation path and automatic steering can be activated. A delay may be provided before automatic navigation commences (e.g., sufficient to allow the operator to clear the RTG crane). The RTG crane may begin automatic steering along the pre-defined navigation path (e.g., to move to the selected container or location).

Among the many advantages offered by the invention, in its various aspects, are improved control and/or verification of vehicle position. Processes according to the invention may, for example, be useful for determining, or confirming, the position of a vehicle 250 on the surface of the earth within the order of a few centimeters, even while the vehicle is in motion. Under purely non-referenced, robotic control (i.e., without satellite-based or other location sensor guidance in accordance with the invention), a vehicle may wander off course, for example due to errors caused by wheel slippage, uneven terrain, and other mechanically-induced errors, and/or navigation or data processing errors; and such errors may grow as a non-linear product of time. Systems and methods in accordance with the invention may use satellite-based RTK navigation solutions and attitude information to correct the errors in the steering system 240 so that the vehicle tracks the pre-defined navigation path to within acceptable accuracy of the satellite-based RTK solutions (e.g., to within a few centimeters).

Figure 5:
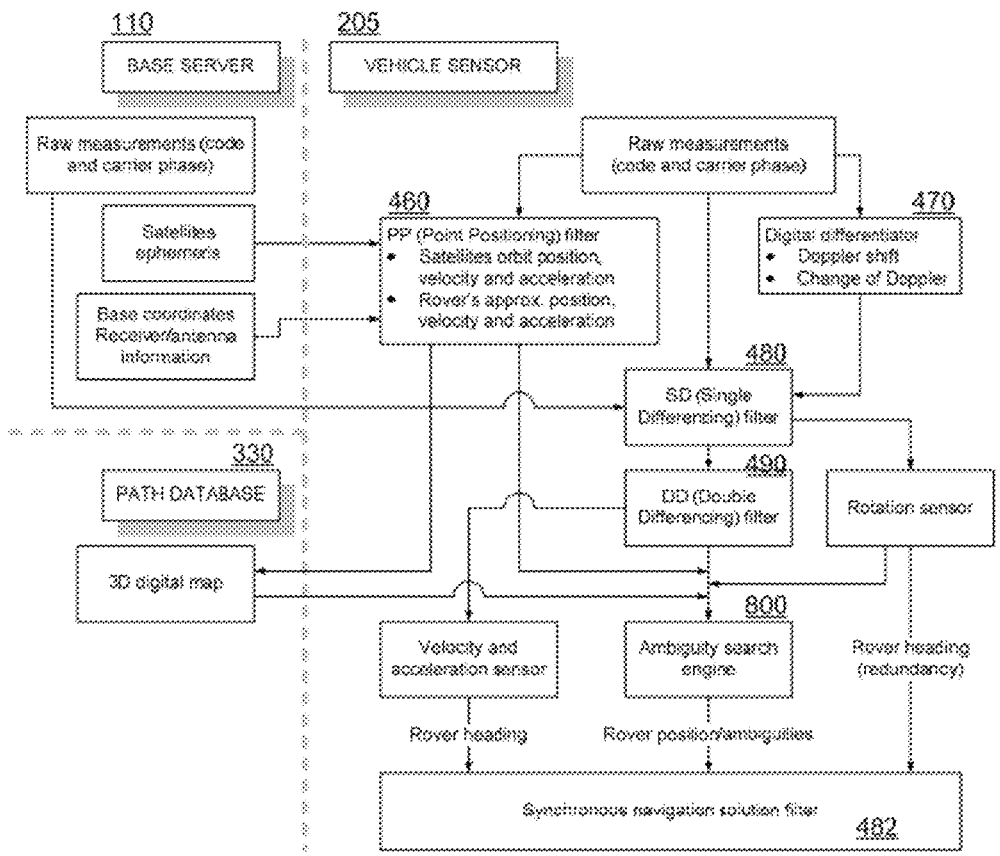
FIG. 5 is a schematic diagram illustrating aspects of an example of synchronous data processing operations in accordance with embodiments the invention.

FIG. 5 is a schematic diagram illustrating aspects of synchronous data processing operations 420 in accordance with various embodiments of the invention. A process 420 may be carried out by, for example, vehicle client system(s) 210, and may be implemented using single or multiple vehicle sensors 205. A primary use of a synchronous process 420 may be in resolving carrier-phase ambiguities in the satellite-based data. The result(s) of such process 420 may further be used in other processes to estimate or confirm current vehicle position, either directly using satellite-based data or using dead reckoning or other processes to extrapolate from a last known fixed position.

A process 420 may synchronize raw data from known position information, base station sensor(s) 105 and/or vehicle sensor(s) 205 to resolve any ambiguities (e.g., integer ambiguities) in satellite-based carrier-phase observations, using base station(s) 100 and/or base station sensor(s) 105 to define relatively stationary or otherwise well-known reference point(s) for a vehicle 250 in relative proximity to the base station(s), which may be provided to vehicle client system(s) 210 for use in estimating vehicle positions by the client system(s) 210 in order to increase confidence in the actual location(s) of the corresponding vehicle(s). In general, in the process 420, satellite-based data (e.g., obtained by the base station's sensor(s) 105) may be sent from the base station system 100 to the vehicle system 200 to be synchronized with the vehicle's satellite-based data (e.g., obtained by the vehicle's sensor(s) 205). The known position of the base station 100 may be used to process data from both the base station sensor(s) 105 and the vehicle sensor(s) 205 to estimate the position of the vehicle. Such processing may include ambiguity resolution. Such processing may also include differential processing (e.g., subtracting vehicle data from base station data) to remove or reduce common errors.

As will be understood by those skilled in the relevant arts, once they have been made familiar with this disclosure, the use of reference points in relatively close proximity to vehicles 250 can help to minimize error in, i.e., increase the accuracy of, vehicle position and orientation determinations in accordance with the disclosure.

A vehicle client 210 may receive position information from a base server 110, including, for example, raw satellite-based measurements (e.g., code and carrier phase information), satellite ephemeris information, and base coordinates and receiver/antenna information from each base station 105. The vehicle client 210 may also receive information from a path database 330, for example a three-dimensional (3D) digital map of the pre-defined path. The vehicle client 210 may also receive information from the vehicle sensor(s) 205 (e.g., code and carrier phase information).

Vehicle satellite-based raw measurements, base station satellite ephemeris information and base coordinates may be used in a point positioning (PP) filter 460 in order to determine the orbit position, velocity and acceleration of the satellites from which the raw measurements were obtained, and/or the approximate position, velocity and acceleration of the vehicle 250. In the matching portion of a map and match programming processes, such navigation information may be used to initialize and may help to expedite the search process (i.e., map matching) in the path database 330.

Vehicle raw measurements may also be used in a digital differentiator 470, to determine Doppler shift and change of Doppler shift. The Doppler shift value and change of Doppler shift value may be used, in addition to the velocity and acceleration values derived from the satellite-based data, for estimating the vehicle velocities and accelerations.

Data representing vehicle satellite-based raw measurements, the digital differentiator 470 and the base station satellite-based raw measurements may be used in a single differencing (SD) filter 480. The SD filter 480 may be useful for filtering out common errors between a pair of satellites 99 (e.g., satellite clock errors, satellite orbit errors, satellite antenna phase centre offset, satellite instrumental group delay, satellite phase wind-up, and errors due to ionospheric and/or tropospheric delay) or between a pair of satellite receivers or sensors 105, 205 (e.g., satellite receiver clock error, receiver antenna phase centre offset, receiver instrumental group delay, and receiver phase wind-up).

Results from the SD filter 480 may be further processed using a double differencing (DD) filter 490. The DD filter 490 may be useful for filtering out common errors (e.g., similar to those described with respect to the SD filter 480) between a pair of satellite receivers and a pair of satellites.

Although not shown, in further embodiments triple differencing (TD) filters may be used. Results from the DD filter 490 may be further processed using the TD filter, which may be useful for filtering out sudden large errors, such as sudden jumps in the carrier-phase observations (e.g., cycle slips due to a loss of signal phase lock in the base station sensor(s) 105 and/or the vehicle sensor(s) 205).

Filtered sensor data from an SD filter 480 may also be used to calculate the rotation or orientation of the vehicle sensor 205. The rotation or orientation of the vehicle sensor 205 may be used to determine the heading (i.e., predicted direction or other angular attitude) of the vehicle 250, e.g., as a redundancy check. Such determinations may be based on detection of orientation by the sensor 205 using, for example, polarization detectors. In some examples, rotation may be sensed by a single sensor 205 on the vehicle, however in other examples, two or more sensors 205 on the vehicle may be used for determining orientation of the vehicle.

Results from the DD filter 490 may be used to calculate velocity and acceleration of the vehicle sensor 205. The velocity and acceleration of the vehicle sensor 205 may be used to determine the heading (i.e., predicted direction) of the vehicle.

Data from the DD filter 490, PP filter 460, sensor rotation and the pre-defined path may be used in an ambiguity search engine 800, in order to determine the vehicle position and/or ambiguity parameters.

Vehicle heading (e.g., including redundant solutions), vehicle position and ambiguity parameters may be used as input to a synchronous navigation solution filter 482 to generate position data for use in generating control commands and as input to asynchronous processes as described herein. The results of the process 420 may be used as a navigation solution filter, to help improve reliability of further asynchronous processes, for example as described below.

Figure 6:
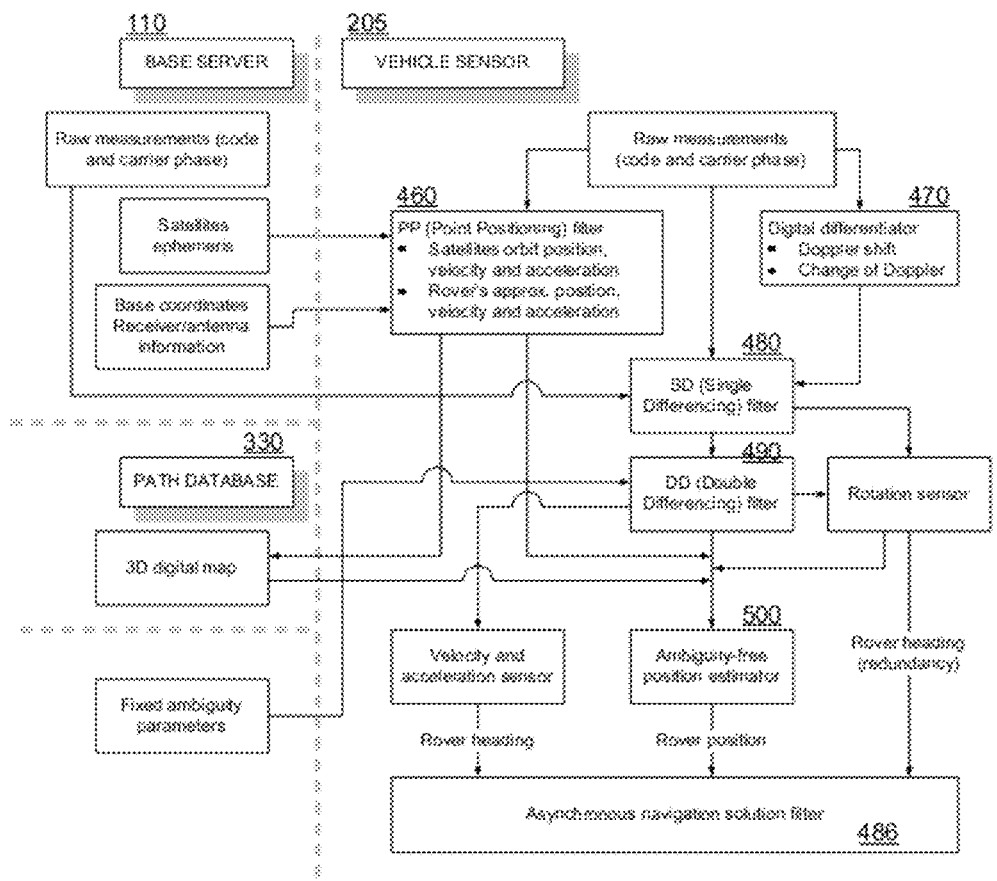

FIG. 6 schematically illustrates an example process 430 for asynchronous data processing in accordance with aspects of the invention. In the embodiment shown, process 430 is generally similar to process 420 of FIG. 5, except that it includes use of ambiguity parameters determined using data provided by base station system(s) 100 in accordance with, for example, synchronous processing techniques such as process 420.

A process 430 such as that shown in FIG. 6 may be implemented at relatively moderate rates (e.g., approximately 10 Hz in some embodiments) suitable for use in guiding a vehicle 250, but faster than the synchronous processing rate (e.g., approximately 1 Hz, in some embodiments) used for data received from base station server(s) 110 for, e.g., determining position fixes for the location of a vehicle 250).

A process 430 such as that shown in FIG. 6 may be useful for, for example, determining estimated vehicle positions, velocities, accelerations, and attitudes (e.g., headings) in a substantially real-time manner, using old or previously determined information from synchronous processes such as process 420 of FIG. 5. The example process 430 may process satellite-based raw measurements from the base station(s) 105 and the vehicle in an asynchronous manner, at the vehicle's data rate (e.g., 10-20 Hz), for example calculated ambiguity parameters previously processed according to the synchronous data processing described above.

Vehicle client system(s) 210 may receive information from corresponding base station server(s) 110, including, for example, raw satellite-based measurements (e.g., code and carrier phase information), satellite ephemeris information, and base coordinates and receiver/antenna information from each base station(s) 105. Information from the base station server(s) 110 may include asynchronously-determined information (i.e., information extrapolated from old information, as opposed to real-time or current information) to accommodate a base station server 110's slower data processing rate, for example. A vehicle client system 210 may also access or otherwise receive information from a path database 330, for example a two- or three-dimensional (2D or 3D) digital map of the pre-defined path. The vehicle client 210 may also receive information from vehicle sensor(s) 205 (e.g., code and carrier phase information). The vehicle client 210 may also access or otherwise receive or have stored (e.g., in the vehicle client's memory) ambiguity parameters that have been resolved and any additional correction factors calculated according to the synchronous data processing described above.

The vehicle satellite-based raw measurements, base station satellite ephemeris information and base coordinates may be used in a point positioning (PP) filter 460. This may use the orbit position, velocity and acceleration of satellites from which position data has been received in order to determine the approximate position, velocity and acceleration of the vehicle. In the matching portion of map and match programming, this navigation information may be used to initialized and may help to expedite the search process (i.e., map matching) in the path database 330.

The vehicle raw measurements may also be used in a digital differentiator 470, to determine Doppler shift and change of Doppler shift. The Doppler shift value and change of Doppler shift value may be used, in addition to the velocity and acceleration values derived from the satellite-based data, for estimating the vehicle velocities and accelerations.

Data from the vehicle raw measurements, the digital differentiator 470 and the base station raw measurements may be used, as in process 420, in conjunction with single differencing (SD), double differencing (DD), and/or triple differencing (TD) filters filter to eliminate common errors or sudden jumps in data from a pair of sensors 105, 205 and/or a pair of satellites 99.

Results from SD filter(s) 480 may be used to calculate the rotation or orientation of the vehicle sensor 205. The rotation or orientation of a vehicle sensor 205 may be used to determine the heading (i.e., predicted direction) of the vehicle, e.g., as a redundancy check.

Results from DD filter(s) 490 may be used to calculate velocity, acceleration and/or rotation or orientation of vehicle sensor(s) 205. The velocity and acceleration of vehicle sensor (s) 205 may be used to determine the heading (i.e., predicted direction) of the vehicle(s). The relative rotation or orientation of vehicle sensor(s) 205 may be used to determine the heading (i.e., predicted direction) of the vehicle(s), e.g., as a redundancy check.

Data from DD filter(s) 490 and from PP filter(s) 460; vehicle rotation data; pre-defined path data; and/or previously-calculated ambiguity parameters (e.g., from synchronous data processing 420) may be used as input to ambiguity-free position estimator 500 to determine vehicle position. An ambiguity-free position estimator 500 may implement any position estimator processes suitable for the purposes disclosed herein.

Vehicle heading (e.g., including redundant solutions) and vehicle position information may be used as input to an asynchronous navigation solution filter 486.

Output from asynchronous navigation solution filter 486 may be further used (e.g., in a fuzzy logic controller 450) to generate control commands for automatic control of the vehicle's steering, and such control commands may be transmitted to the steering system 240 for the vehicle.

FIG. 7 schematically illustrates an example process 440 for fast (or relatively faster) asynchronous data processing in accordance with aspects of the invention. In the example shown, fast asynchronous data process 440 may be implemented at a relatively fast rate suitable for the vehicle client 210 but faster than the data processing rate for the base station server 110 (e.g., substantially faster than 1 Hz). Calculations in this example process may be simplified compared to the example asynchronous data processing 430 described above, for example in order to lessen computing power and accommodate the faster rate.

Relatively faster asynchronous processes such as that shown in FIG. 7 may, for example, be used advantageously to monitor and/or control navigation processes that are particularly sensitive to stability or other control issues, such that any problematic instabilities may be prevented before they exceed a predefined tolerance threshold.

In the example shown, process 440 may process satellite-based raw measurements from the base station(s) 105 and the vehicle sensor(s) 205 at a rate (e.g., above 20 Hz) higher than that implemented by either synchronous process 420 or relatively slow asynchronous process 430. Calculation of dynamic information about the satellite and the vehicle, and calculation of ambiguity-free vehicle position may be omitted to simplify data processing, in order to accommodate a required or desired higher control sampling and command generation rate.

A vehicle client 210 may receive information from base station server(s) 110, including, for example, satellite-based raw measurements (e.g., code and carrier phase information). Information provided by base station server(s) 110 may include out-of-date or latent information (i.e., old information as opposed to real-time, current information) to accommodate continuous control input, in spite of relatively slow base station server processing rates by, for example, extrapolating from last-known synchronously-derived data. The vehicle client 210 may also receive information from a path database 330, for example a three-dimensional (3D) digital map of the pre-defined path and previously-calculated ambiguity parameters (e.g., from synchronous data processing 420). The vehicle client 210 may also receive information from the vehicle sensor(s) 205 (e.g., code and carrier phase information), and from relatively slower asynchronous processes 420.

As in the case of previously-described synchronous and asynchronous processes 420, 430, SD, DD, and TD filters may be applied.

Results from SD filter(s) 480 may be used to calculate particularly sensitive or critical rotational or orientation information for vehicle sensor(s) 205. Results from SD filter(s) 480 may also be used as input by DD filter(s) 490. Results generated by DD filter(s) 490 may also be used to calculate rotational or orientation information for the vehicle sensor 205. The rotation or orientation of vehicle sensor(s) 205 may be used to determine the heading (i.e., predicted current direction of travel) of a vehicle.

Satellite-based sensor rotation and pre-defined path data may be used in generating control command signals using a fast asynchronous navigation solution filter 488. Such commands can be used, for example, to control rotational or particularly unstable navigational parameters. Results of processes may be further used (e.g., in a fuzzy logic controller 450) to determine control commands for automatic control of the vehicle's steering, and such control commands may be transmitted to the steering system 240 for the vehicle.

Any suitable ambiguity resolution process may be implemented by, for example, an ambiguity search engine or application 800, and executed in conjunction with, or as a part of, a synchronous data process 420 of FIG. 5. A suitable ambiguity resolution process may for example be implemented as a module or application executed by a base station server system 110 and/or a vehicle client system 210. For example, an ambiguity resolution process may resolve integer ambiguities using calculations based on satellite carrier phase information. The calculated ambiguity resolution may be used as input to a synchronous navigation solution filter 482 and the results used in further processing, for example by the fuzzy logic controller 450, to determine and generate steering and/or other navigational control commands.

Any suitable satellite-based rotation determination process may be used in combination with, for example, the example data processes of FIGS. 5, 6 and 7. Such rotation determination processes may, for example, be useful for determining the orientation of a vehicle 250 having only a single sensor 205. Such processes may further, for example, be implemented as a module or application to be executed, for example by vehicle client system(s) 210. The results of the rotation determination process may be used as input to a synchronous navigation solution filter 482 and/or an asynchronous navigation solution filter 486 and the results used in further processing, for example by the fuzzy logic controller 450, to determine and generate steering and/or other navigational control commands.

Any suitable fuzzy logic signal processing operation 450 may be used in implementing aspects of the invention. The process may be suitable for execution by, for example, vehicle client system(s) 210 as a part of, or in conjunction with, process(es) such as that shown in FIG. 4.

The fuzzy logic controller 450 may receive or otherwise access data defining or otherwise related to a pre-defined or otherwise; desired path (e.g., in the form of a 3D digital map) from the path database 330, which may be stored at the base station system 100, stored at the vehicle system 200 or otherwise accessible by the vehicle client 210. Such example process may also receive fuzzy logic controller (FLC) input/output optimization parameters, for example from a FLC optimization component, which may reside in the base station system 100, the vehicle system 200 or otherwise accessible by the vehicle client 210. In some examples, the process may be carried out off-line or may be carried out on-line, for example where computer resources are sufficient.

The FLC process may receive as input determined navigation solutions (e.g., from process 430 or process 440) and may generate as output calculated steering and/or other navigational control commands (e.g., steering angle and speed commands).

While the present disclosure refers to use of synchronous, asynchronous and fast asynchronous data processing, at various data processing rates, it should be understood that one or some of such processes may be omitted, and that processing rates may vary over a very wide range of cycle speeds. For example, asynchronous data processing may not be necessary where the base station server data processing rate is as fast as or faster than the vehicle client data processing rate. In another example, fast asynchronous data processing may not be necessary where the vehicle client has sufficient computing power to carry out asynchronous data processing at relatively fast rates even without simplifying calculations, for example, to control a high-speed or potentially unstable vehicle 250.

Although certain calculations and algorithms have been described, it should be understood that the present disclosure is not in all cases limited to such calculations or algorithms, and variations may be possible.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

Many variations and modifications of the systems, methods, and programming products described herein may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines. Examples of processing rates described are only for the purpose of illustration and are not intended to be limiting.

What is claimed is:

1. A control system for a rubber-tired gantry (RTG) crane, comprising:
    a global navigation satellite system (GNSS) receiver mounted on a RTG crane;

at least one transceiver for processing signals received from at least one GNSS receiver located at a base station associated with a known location; and a controller comprising at least one data processor configured to:
generate, using the known position associated with the base station and signals received from the GNSS receiver located at the base station, a satellite observation error estimate;
generate, using the satellite observation error estimate and a position of the RTG crane determined using signals received from the GNSS receiver mounted on the RTG crane, at least one control signal representing a navigation command executable by at least one control device of the RTG crane;
in accordance with a determination that signals received from the GNSS receiver located at the base station are processed by the controller at a slower rate than signals received from the GNSS receiver mounted on the RTG crane, generate the control signal at least partly by performing at least one asynchronous process at the RTG crane, the at least one asynchronous process comprising, prior to receipt of real-time signals from the GNSS receiver located at the base station, processing previously received signals from the GNSS receiver located at the base station for interim navigation, the processing accounting for anticipated errors in the signals received from the GNSS receiver located at the base station; and to output the control signal for execution by the control device.

2. The control system of claim 1, wherein the determined position of the vehicle includes at least one of a geographic location and a vehicle attitude.

3. The control system of claim 1, wherein the controller is configured, in generating the at least one control signal, to resolve one or more ambiguities in carrier phase information received by at least one of the GNSS receivers.

4. The control system of claim 3, wherein the controller is configured, in resolving ambiguities in carrier phase information received by at least one of the GNSS receivers, to use double-differencing methods.

5. The control system of claim 1, wherein the controller is configured, in generating the at least one control signal, to use position data generated in both synchronous and asynchronous modes.

6. The control system of claim 1, wherein the controller is configured, in generating the at least one control signal, to use data generated in a plurality of asynchronous modes.

7. The control system of claim 1, comprising at least a second global navigation satellite system (GNSS) receiver mounted on the vehicle.

8. The control system of claim 1, wherein the controller is configured, in generating the at least one control signal, to process data using fuzzy logic techniques.

9. The control system of claim 1, wherein the controller is configured, in generating the at least one control signal, to use data generated using proportional-integral-derivative feedback techniques.

10. A method of controlling a rubber-tired gantry (RTG) crane, the method performed by a controller comprising at least one data processor and the method comprising:
generating, using a known position associated a base station and signals received from a Global Navigation Satellite System (GNSS) receiver located at the base station, a satellite observation error estimate;
generating, using the satellite observation error estimate and a position of the RTG crane vehicle determined using position data received from a GNSS receiver mounted on the RTG crane vehicle, at least one control signal representing a navigation command executable by at least one control device of the RTG crane;
in accordance with determining that signals received from the GNSS receiver located at the base station are processed by the controller at a slower rate than signals received from the GNSS receiver mounted on the RTG crane, generating the control signal at least partly by performing at least one asynchronous process at the RTG crane, the at least one asynchronous process comprising, prior to receipt of real-time signals from the GNSS receiver located at the base station, processing previously received signals from the GNSS receiver located at the base station for interim navigation, the processing accounting for anticipated errors in the signals received from the GNSS receiver located at the base station; and to outputting the control signal for execution by the control device.

11. The method of claim 10, wherein the determined position of the vehicle includes at least one of a geographic location and a vehicle attitude.

12. The method of claim 10, comprising the controller, in generating the at least one control signal, resolving one or more ambiguities in carrier phase information received by at least one of the GNSS receivers.

13. The method of claim 12, comprising the controller, in resolving ambiguities in carrier phase information received by at least one of the GNSS receivers, using double-differencing methods.

14. The method of claim 10, comprising the controller, in generating the at least one control signal, using position data generated in both synchronous and asynchronous modes.

15. The method of claim 10, comprising the controller, in generating the at least one control signal, using data generated in a plurality of asynchronous modes.

16. The method of claim 10, comprising the controller, in generating the at least one control signal, processing data using fuzzy logic techniques.

17. The method of claim 10, comprising the controller, in generating the at least one control signal, using data generated using proportional-integral-derivative feedback techniques.

18. A non-transitory machine-readable media comprising programmed instructions executable by a processor of a controller and configured for causing the controller to:
generate, using a known position associated with a base station and signals received at a global navigation satellite system (GNSS) receiver mounted on a rubber-tired gantry (RTG) crane from a receiver located at the base station, a satellite observation error estimate;
generate, using the satellite observation error estimate and a position of the RTG crane vehicle determined using position data received from the GNSS receiver mounted on the RTG crane, at least one control signal representing a navigation command executable by at least one control device of the RTG crane; and to
in accordance with a determination that signals received from the GNSS receiver located at the base station are processed by the controller at a slower rate than signals received from the GNSS receiver mounted on the RTG crane, generate the control signal at least partly by performing at least one asynchronous process at the RTG crane, the at least one asynchronous process comprising, prior to receipt of real-time signals from the GNSS receiver located at the base station, processing previously received signals from the GNSS receiver located at the base station for interim navigation, the processing accounting for anticipated errors in the signals received from the GNSS receiver located at the base station; and to output the control signal for execution by the control device.

* * * * *